3,256,272
DERIVATIVES OF ALPHA-THIOCINNAMYL PENICILLIN

Teiichiro Ito, Tadao Ishii, and Hiroshi Ogawa, Tokyo, Japan, assignors to Meiji Seika Kaisha, Ltd., Chuo-ku, Tokyo, Japan, a corporation of Japan
No Drawing. Filed Aug. 5, 1964, Ser. No. 387,794
Claims priority, application Japan, Aug. 10, 1963, 38/40,926; Mar. 28, 1964, 39/17,043
7 Claims. (Cl. 260—239.1)

This invention relates to new synthetic penicillins and to a process for the production of new synthetic penicillins which are new derivatives of 6-aminopenicillanic acid and are useful for the cure of human and animal diseases.

Since discovery of benzylpenicillin, this has been exhibiting an excellent effect as a chemical therapeutic agent. However, the advent of so-called penicillin-fast microbes has reduced the effect of benzylpenicillin. In order to overcome such microbes, synthetic penicillins, for example, dimethoxyphenylpenicillin have come to be marketed. However, these synthetic penicillin-fast staphylococci also have been observed to exist. Research are being carried on to discover penicillins which are effective even against such microbes. The penicillins according to the present invention are effective not only against staphylococci and pneumococci but also against said penicillin-fast microbes.

According to the present invention, there are provided new synthetic penicillins represented by the general formula:

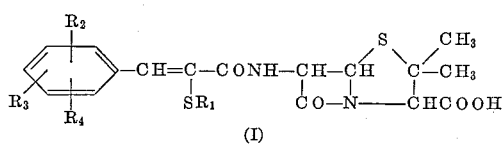

(I)

wherein $R_1$ is selected from the group consisting of a lower alkyl radical, phenyl radical and phenyl alkyl radical having less than 10 carbon atoms; and $R_2$, $R_3$ and $R_4$ are the same or different and are selected from the group consisting of hydrogen atom, nitro radical, amino radical, lower alkylamino radical, lower dialkylamino radical, lower alkanoylamino radical, lower alkyl radical, chlorine, bromine, iodine, lower alkoxy radical, hydroxy radical, sulfamyl radical, benzyl radical, cyclohexyl radical, phenyl radical and trifluoromethyl radical, and nontoxic salts thereof. The salts are nontoxic salts including nontoxic metallic salts such as sodium, potassium, calcium and aluminium, ammonium and substituted ammonium salts, e.g. salts of such nontoxic amines as trialkylamine, including triethylamine, procaine, dibenzylamine, N,N'-dibenzylethylenediamine and other amines which usually have been used to form salt with benzylpenicillin.

The present invention also provides a process for the production of the penicillins represented by the general Formula I and their nontoxic salts which comprises reacting 6-aminopenicillanic acid with an acid chloride, acid bromide, anhydride or mixed anhydride derived from new carboxylic acids represented by the general formula:

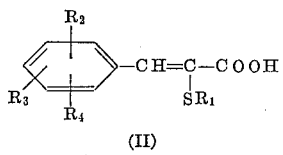

(II)

wherein $R_1$, $R_2$, $R_3$ and $R_4$ are the same as are mentioned above.

The present invention will be explained in detail with respect to the case of acid chloride or acid bromide being used. The acid chloride or bromide of the acid represented by the general Formula II is dissolved in such solvent as acetone. This solution is added to an aqueous solution of 6-aminopenicillanic acid and sodium bicarbonate. After the reaction, the solution is extracted with organic water-immiscible solvent such as ether to remove unreacted materials and hydrolyzed raw materials. The solution is then made acid by addition of proper acid and is extracted with an organic water-immiscible solvent such as ether, methylisobutyl ketone or butyl acetate. Water is then added to the organic solvent extract. The pH of the solution is adjusted to 5–7 by addition of alkali thereto. The reaction product is transferred into water in the form of alkali salt. Elimination of water therefrom by drying such as freezing gives the desired synthetic penicillin. As the chloride or bromide reacts sooner with water than with 6-aminopenicillanic acid, the reaction must be carried out in an anhydrous condition. In this case, an anhydrous solvent such as acetone, including triethylamine, is used to dissolve 6-aminopenicillanic acid. The acid chloride or bromide in the similar solvent is added thereto for reaction. Ether and water are added to the reaction mixture. The reaction mixture containing the product is made acid and is washed with water. Water is then added again to the solution. The reaction product is then transferred into water by addition of alkali. Elimination of water by the same manner as in the above gives the desired penicillin.

In the case of a mixed anhydride being used for reaction, an alkyl halogenocarbonate and amine are caused to react with an acid represented by the general Formula II in such anhydrous inert solvent as, for example, tetrahydrofuran or dioxane. The reaction product is then mixed for reaction with 6-aminopenicillanic acid and an aqueous solution of amine or sodium bicarbonate. Then the reaction mixture is washed with a water-immiscible solvent to remove unreacted raw materials. Thereafter such water-immiscible solvent as, for example, ether, methylisobutyl ketone is added to the water layer and the reaction product is then transferred into the solvent by addition of acid. Then water is added thereto and pH is adjusted to 5–7 by addition of alkali to transfer the product into water. Elimination of water by drying such as freezing gives the desired synthetic penicillin. After completion of the reaction, the product, if desired, may be isolated in such a manner as is applied to phenoxyethyl penicillin. That is to say, a solution of the free acid of the synthetic penicillin in such solvent as ether is prepared and is dehydrated. A solution of potassium 2-ethylhexanoate in an organic solvent is added thereto and the product may be converted to a potassium salt in the organic solvent.

The product can be isolated also in a form of other amine salt such as procaine or dibenzylethylenediamine which would be used for isolation of benzylpenicillin and the like.

We have further found that the synthetic penicillins of the general formula I according to the present invention may react with dibenzylethylenediamine or its salt with an acid to form such salts which are sparingly soluble in water and likely to crystallize and which therefore may form stable suspensions and useful for injection and oral administration.

The dibenzylethylenediamine salts of the synthetic penicillins of the general Formula I may be prepared either by reacting the free acid of the penicillins of the general Formula I with free dibenzylethylenediamine in an organic solvent such as butyl acetate, amyl acetate, ether, chloroform, n-butanol and acetone, or by reacting an alkali metal or alkaline earth metal salt of said pencillins with a dibenzylethylenediamine acid salt such as acetate in an aqueous medium.

Examples of the present invention are given in the following:

EXAMPLE 1

*α-Methylthio-o-chloro-cinnamyl penicillin (sodium salt)*

α-Methylthio-o-chloro-cinnamyl chloride (750 mg.) having the structural formula

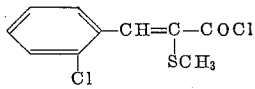

were dissolved in 40 ml. of acetone. This solution was added with stirring to a solution of 470 mg. of 6-aminopenicillanic acid and 930 mg. of sodium bicarbonate in 12 ml. of water. After stirring for 2 hours under ice cooling, the mixed solution was well washed with ether. The water layer was separated, was added with 10 ml. of ether and was adjusted to pH 2 by addition of phosphoric acid. The ether layer was separated and added with 10 ml. of water. The solution was adjusted to pH 6 by addition of an aqueous caustic solution under ice cooling, thereby the product was extracted and transferred into water layer. The freezing drying of water layer gave sodium salt of α-methylthio-o-chloro-cinnamyl penicillin. Yield: 690 mg. $[\alpha]_D^{19}$ +163° (in water).

Elemental analysis (as $C_{18}H_{18}N_2S_2O_4ClNa \cdot H_2O$):

|  | C | H | N |
|---|---|---|---|
| Found (percent) | 46.05 | 4.3 | 5.6 |
| Calcd. (percent) | 46.3 | 4.3 | 6.0 |

The antibiotic action of this penicillin in vitro as compared with that of a potassium salt of benzylpenicillin (penicillin G) was as follows:

MINIMUM INHIBITING CONCENTRATION (MCG./ML.)

|  | Staphylococcus aureus 209 P | Streptococcus haemolyticus | Diplococcus pneumoniae Type 1 |
|---|---|---|---|
| Present synthetic penicillin | 0.078 | 0.004 | 0.009 |
| Penicillin G | 0.039 | 0.004 | 0.019 |

The minimum inhibiting concentration (mcg./ml.) against the penicillin G-fast staphylococcus was as follows:

| Fast-microbes | $R_1$ | $R_2$ | $R_3$ | $R_4$ | $R_5$ | $R_6$ |
|---|---|---|---|---|---|---|
| Present penicillin | 0.78 | 25 | 6.25 | 1.56 | 0.78 | 1.56 |
| Penicillin G | 500 | 25 | 500 | 1,000 | 50 | 1,000 |

| | $R_7$ | $R_8$ | $R_9$ | $R_{10}$ | $R_{11}$ | $R_{12}$ |
|---|---|---|---|---|---|---|
| Present penicillin | 0.08 | 0.39 | 1.56 | 1.56 | 0.78 | 0.04 |
| Penicillin G | 3.13 | 6.25 | 100 | 100 | 50 | 3.13 |

| Fast-microbes | Ohara strain | Tanaka strain | Imanari strain | Okazaki strain |
|---|---|---|---|---|
| Present penicillin | 1.56 | 1.56 | 1.56 | 1.56 |
| Penicillin G | 1,000 | 1,000 | 1,000 | 1,000 |

The acute toxicity of the present pencillin against mice was $LD_{50}$ 600–700 mg./kg. in intravenous injection.

EXAMPLE 2

*α-Methylthio-p-methoxy-cinnamyl penicillin (sodium salt)*

448 mg. of α-methylthio-p-methoxy-cinnamic acid (structural formula:

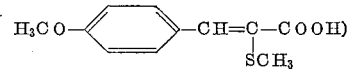

and 220 mg. of triethylamine were dissolved in 10 ml. of tetrahydrofuran. To this solution 260 mg. of ethyl chloroformate were added with stirring under ice cooling and stirred for one hour. The mixture was then added to a solution of 430 mg. of 6-aminopenicillanic acid and 170 mg. of sodium bicarbonate in 8 ml. of water and stirred for 2 hours. The reaction product was washed well with ether and added with ether and adjusted to pH 2 by addition of phosphoric acid to transfer the product into ether. Thereafter the ether layer was separated and then added with water. The solution was adjusted to pH 6 by addition of aqueous caustic soda solution in drop wise. On freezing of water layer, sodium salt of α-methylthio-p-methoxy-cinnamyl penicillin was obtained in the form of powder. The minimum inhibiting concentration of said penicillin against *Staphylococcus aureus* was 0.5 mcg./ml.

EXAMPLE 3

The following synthetic penicillins were prepared from the under-mentioned acids by the same procedure as mentioned in Examples 1 and 2. Their minimum inhibitory concentrations (MIC) in mcg./ml. in vitro against *S. aureus* 209 P were shown together.

| Acids | Penicillins | MIC (mcg./ml.) |
|---|---|---|
| α-methylthiocinnamic acid | α-methylthiocinnamyl penicillin. | 0.16 |
| α-methylthio-m-chlorocinnamic acid. | α-methylthio-m-chlorocinnamyl penicillin. | 0.16 |
| α-methylthio-p-chlorocinnamic acid. | α-methylthio-p-chlorocinnamyl penicillin. | 0.16 |
| α-methylthio-2,4-dichlorocinnamic acid. | α-methylthio-2,4-dichlorocinnamyl penicillin. | 0.32 |
| α-methylthio-o-bromocinnamic acid. | α-methylthio-o-bromocinnamyl penicillin. | 0.16 |
| α-methylthio-p-dimethylamino-cinnamic acid. | α-methylthio-p-dimethylamino-cinnamyl penicillin. | 1.25 |
| α-ethylthio-o-chlorocinnamic acid. | α-ethylthio-o-chlorocinnamyl penicillin. | 0.16 |

EXAMPLE 4

The following synthetic penicillins were prepared from the under-mentioned acids by the same procedure as mentioned in Examples 1 and 2. Their minimum inhibitory concentration in mcg./ml. against *S. aureus* 209 P were shown together.

| Acids | Penicillins | MIC (mdg./ml.) |
|---|---|---|
| α-methylthio-p-methylcinnamic acid. | α-methylthio-p-methyl-cinnamyl penicillin. | 0.16 |
| α-methylthio-p-bromo-cinnamic acid. | α-methylthio-p-bromo-cinnamyl penicillin. | 0.20 |
| α-methylthio-o-methoxy-cinnamic acid. | α-methylthio-o-methoxy-cinnamyl penicillin. | 0.16 |
| α-methylthio-2-hydroxy-3-methoxy-cinnamic acid. | α-methylthio-2-hydroxy-3-methoxy-cinnamyl penicillin. | 0.60 |
| α-methylthio-3,5-dibromo-4-hydroxy-cinnamic acid. | α-methylthio-3,5-dibromo-4-hydroxy-cinnamyl penicillin. | 0.16 |
| α-methylthio-3,4-methylenedioxy-cinnamic acid. | α-methylthio-3,4-methylenedioxy-cinnamyl penicillin. | 0.32 |
| α-(n-propylthio)-cinnamic acid. | α-(n-propylthio)-cinnamyl penicillin. | 1.35 |
| α-(n-propylthio)-p-chloro-cinnamic acid. | α-(n-propylthio)-p-chloro-cinnamyl penicillin. | 0.60 |
| α-(n-butylthio)-cinnamic acid. | α-(n-butylthio)-cinnamyl penicillin. | 1.35 |
| α-benzylthio-cinnamic acid | α-benzylthio-cinnamyl penicillin. | 0.20 |
| α-benzylthio-o-chloro-cinnamic acid. | α-benzylthio-o-chloro-cinnamyl penicillin. | 0.20 |

EXAMPLE 5

*N,N'-dibenzylethylenediamine salt of
α-methylthio-o-chloro-cinnnamyl penicillin*

To a solution of 1.5 g. of 6-aminophenicillanic acid and 3.0 g. of sodium bicarbonate dissolved in 37 ml. of water, a solution of 2.4 g. of α-methylthio-o-chloro-cinnamyl chloride in 15 ml. of acetone was added with stirring. After stirring for 2 hours under ice cooling, the solution was washed with methylisobutyl ketone. The water layer was separated, was added with 30 ml. of isoamylacetate and was adjusted to pH 2 by addition of phosphoric acid. The isoamylacetate layer was separated and added with 25 ml. of water. The solution was adjusted to pH 6 by addition of an aqueous caustic soda solution under ice cooling. The water layer was separated and was concentrated under reduced pressure to 5 ml. To this solution, a solution of 600 mg. of N,N'-dibenzylethylenediamine diacetate in 6 ml. of water was added. The separated needle crystals were filtered, washed with water, and recrystallized from a mixture of acetone and water. Yield 1.8 g. $[\alpha]_D^{23}$ +100° (in acetone).

Elemental analysis (as $C_{52}H_{58}N_6S_4O_8Cl_2 \cdot H_2O$):

|   | C | H | N |
|---|---|---|---|
| Found (percent) | 56.05 | 5.3 | 7.2 |
| Calcd. (percent) | 56.15 | 5.4 | 7.5 |

EXAMPLE 6

*N,N'-dibenzylethylenediamine salt of
α-ethylthio-o-chloro-cinnamyl penicillin*

A solution of 1.2 g. of sodium salt of α-ethylthio-o-chlorocinnamyl penicillin in 5 cc. of water was mixed with a solution of 0.4 g. of dibenzylethylenediamine acetate in 5 cc. of water. An oil was deposited, which gradually crystallized on standing. The separated crystals were dissolved in acetone and recrystallized by addition of water to give 1.1 g. of needle crystals, M.P. 70–90° C. with decomposition.

Analysis (as $C_{54}H_{62}N_6S_4O_8Cl_2 \cdot H_2O$):

|   | C | H | N |
|---|---|---|---|
| Found (percent) | 56.62 | 5.60 | 7.12 |
| Calcd. (percent) | 56.88 | 5.66 | 7.37 |

EXAMPLE 7

*N,N'-dibenzylethylenediamine salt of
α-methylthio-p-methyl-cinnamyl penicillin*

To 15 cc. of a solution of 1 g. of α-methylthio-p-methyl-cinnamyl penicillin in the form of the free acid in n-butanol was added a solution of 0.5 g. of dibenzylethylenediamine in 5 cc. of n-butanol. The solvent was distilled off under reduced pressure, and the residue was added with an amount of water to give 0.8 g. of crystalline precipitate. Recrystallization from a mixture of acetone and water gave crystals of a melting point of 90–100° C. with decomposition.

What we claim is:

1. New synthetic penicillins represented by the formula:

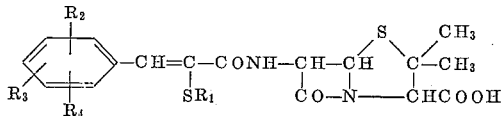

wherein $R_1$ is selected from the group consisting of a lower alkyl, phenyl and phenyl alkyl having less than 10 carbon atoms; and $R_2$, $R_3$ and $R_4$ are the same or different and are selected from the group consisting of hydrogen atom, nitro, amino, lower alkylamino, lower dialkylamino, lower alkanoylamino, lower alkyl chlorine, bromine, iodine, lower alkoxy, hydroxy, sulfamyl, benzyl, cyclohexyl, phenyl and trifluoromethyl.

2. Non-toxic salts of the compounds recited in claim 1, wherein said salts are selected from the group consisting of sodium, potassium, calcium, aluminum, ammonium, triethylamine, procaine, dibenzylamine, and N,N'-dibenzylethylenediamine.

3. Alpha-methylthio-o-chloro-cinnamyl penicillin.
4. Alpha-methylthio-cinnamyl penicillin.
5. Alpha-methylthio-o-methoxy-cinnamyl penicillin.
6. N,N'-dibenzylethylenediamaine salt of alpha-methylthio-o-chloro-cinnamyl penicillin.
7. N,N'-dibenzylethylenediamine salt of alpha-ethylthio-o-chloro-cinnamyl penicillin.

References Cited by the Examiner

FOREIGN PATENTS 882,335   11/1961   Great Britain.

NICHOLAS S. RIZZO, *Primary Examiner.*

IRVING MARCUS, *Examiner.*

JAMES W. ADAMS, *Assistant Examiner.*